United States Patent
Obara et al.

(10) Patent No.: US 6,236,172 B1
(45) Date of Patent: May 22, 2001

(54) DRIVING SYSTEM FOR ELECTRIC VEHICLE

(75) Inventors: Sanshiro Obara, Toukai-mura; Hiroshi Katada; Suetaro Shibukawa, both of Hitachinaka; Nobunori Matsudaira, Hitachi; Shotaro Naito, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/599,099

(22) Filed: Jun. 29, 1999

Related U.S. Application Data

(63) Continuation of application No. 08/864,968, filed on May 29, 1997, now abandoned.

(30) Foreign Application Priority Data

May 29, 1996 (JP) .................................... 8-134939

(51) Int. Cl.[7] ....................................................... H02P 5/17
(52) U.S. Cl. ............................. 318/139; 318/722; 318/254
(58) Field of Search .................................... 318/138, 139, 318/254, 439, 459, 500, 700, 720–724; 388/928.1

(56) References Cited

U.S. PATENT DOCUMENTS

| | | | |
|---|---|---|---|
| 4,217,527 | * | 8/1980 | Bourke et al. ............... 318/139 |
| 4,423,362 | * | 12/1983 | Konrad et al. ............... 318/139 |
| 5,412,293 | * | 5/1995 | Minezawa et al. ............ 318/376 |
| 5,583,406 | * | 12/1996 | Mutoh et al. ................ 318/376 |
| 5,610,483 | * | 3/1997 | Obara et al. ................ 318/139 |
| 5,635,804 | * | 6/1997 | Tanaka et al. ............... 318/139 |
| 5,780,980 | * | 7/1998 | Naito ........................ 318/139 |

FOREIGN PATENT DOCUMENTS 6-315201 11/1994 (JP) .

OTHER PUBLICATIONS

US magazine, Jahns, Th. M.—"Flux–Weakening Regime Operation of an Interior Permanent–Magnet Synchronous Motor Drive" IN: IEEE Transaction on Industry Applications, vol. 1A–23, copy No. 4, Jul./Aug. 1987, pp. 681–689.

* cited by examiner

Primary Examiner—Bentsu Ro
(74) Attorney, Agent, or Firm—Evenson, McKeown, Edwards & Lenahan, P.L.L.C.

(57) ABSTRACT

A method and apparatus for driving an electric vehicle having a synchronous traction motor. A peak value of induced electromotive force of the synchronous motor at a maximum allowable rotating speed is set to a value which is lower than an allowable voltage of the smoothing capacitor of the inverter and lower than a maximum allowable voltage of the power switching elements composing the inverter. The synchronous motor is thus constructed so that a peak value $V_{0max}$ of the maximum induced electromotive force at the maximum allowable rotating speed $N_2$ of the synchronous motor satisfies a relation of $V_{0max} \leq V_{Cmax}$ where $V_{Cmax}$ is an allowable voltage of the smoothing capacitor.

4 Claims, 6 Drawing Sheets

$E_0$ ··· INDUCED ELECTROMOTIVE   $V_1$ ··· MOTOR VOLTAGE
$\delta$ ··· LOAD ANGLE   $\phi$ ··· POWER FACTOR ANGLE
$\beta$ ··· ADVANCE ANGLE

DRIVING SYSTEM FOR ELECTRIC VEHICLE

This application is a continuation of application Ser. No. 08/864,968, filed May 29, 1997, now abandoned.

This application claims the priority of Japanese patent application No. JP-8-134939, the disclosure of which is expressly incorporated by reference herein.

BACKGROUND OF THE INVENTION

The present invention relates to a method and apparatus for driving an electric vehicle having an inverter for converting DC electric power (such as from a battery) into AC electric power, and a synchronous motor as the driving force of the vehicle, particularly a permanent-magnet type synchronous motor.

Development of a permanent-magnet type motor (hereinafter sometimes referred to simply as a "synchronous motor") as a motor for driving an electric vehicle is progressing. The efficiency of the permanent-magnet type synchronous motor can be increased in a low speed and low torque region compared to an induction motor. An electric vehicle driving system using such a permanent-magnet type synchronous motor is disclosed, for example, in Japanese Patent Application Laid-Open No. 6-315201.

In an electric vehicle, for example an electric automobile, in order to obtain a braking force to the vehicle, so-called regenerative braking may be performed using the motor as a generator. In such an electric vehicle, there are some cases in which the motor may be driven at a high speed, above a maximum controllable rotating speed, during coasting on a descending road.

In controlling synchronous motors generally used in the industrial field, when the motor speed increases to a value which exceeds the controllable range, the motor is judged to be in an abnormal condition. In the case of an electric vehicle, the control system is designed so that the motor is controlled by repeatedly driving it up to a maximum allowable speed for the power-train system, and then operating it in a normal re-operation within the controllable range as the speed of the motor is decreased.

When the motor is driven at a speed above the maximum controllable speed, a protective relay provided between the inverter and the motor is actuated, so that the inverter is disconnected to protect it, (and also the battery and control circuits) against a high voltage induced in the permanent-magnet type synchronous motor (generator) when it is driven at a speed above the maximum controllable speed.

However, provision of an additional protective relay between the inverter and the motor makes control complex, the system large in size and higher in cost.

SUMMARY OF THE INVENTION

An object of the present invention is to solve the problems described above and to provide a method and apparatus for controlling an electric vehicle driven by a synchronous motor, with high reliability.

Another object of the invention is to provide such a method and apparatus which provides good protection against failure of the inverter, even when the motor is driven at the maximum allowable rotating speed, at a low cost.

These and other objects and advantages are achieved by the present invention, which provides a driving system for an electric vehicle having a synchronous motor for driving the electric vehicle, an inverter for converting DC electric power from a battery into AC power which is provided to the synchronous motor, a smoothing capacitor connected in parallel to the converter for smoothing the DC electric power, and a PSM control means for performing ON-OFF control of a plurality of power switching elements composing the inverter, based on a torque reference and a motor current. According to the invention, a peak value of induced electromotive force of the synchronous motor of the electric vehicle at a maximum allowable rotating speed is set equal to or less than an allowable voltage of the smoothing capacitor of the inverter, and equal to or lower than a maximum allowable voltage of the power switching elements composing the inverter.

According to another characteristic of the present invention, there is provided a driving system for an electric vehicle having a permanent-magnet type synchronous motor for driving the electric vehicle, an inverter for converting DC electric power from a battery into AC power which is provided to the synchronous motor, a smoothing capacitor connected in parallel to the converter for smoothing the DC electric power, and a PSM control means for performing ON-OFF control of a plurality of power switching elements composing the inverter, based on a torque reference and a motor current. A peak value $V_{Omax}$ of the maximum induced electromotive force at the maximum allowable rotating speed N2 of the synchronous motor is set so that it satisfies the relation $V_{Omax} \leq V_{Cmax}$, where $V_{Cmax}$ is an allowable voltage of the smoothing capacitor.

Thus, according to the present invention, a peak value of induced electromotive force of the synchronous motor of the electric vehicle at a maximum allowable rotating speed is set to or less than an allowable voltage of the smoothing capacitor of the inverter, and lower than a maximum allowable voltage of the power switching elements of the inverter. In other words, a peak value $V_{Omax}$ of the maximum induced electromotive force at the maximum allowable rotating speed N2 of the synchronous motor is set so that it satisfies the relation $V_{Omax} \leq V_{Cmax}$, where $V_{Cmax}$ is an allowable voltage of the smoothing capacitor which is a main part of the inverter.

Therefore, it is possible to provide a method and apparatus for driving an electric vehicle which can prevent failure of the inverter and overcharging of the battery, even when the motor is small in size and low in cost, driven at the maximum allowable rotating speed.

Other objects, advantages and novel features of the present invention will become apparent from the following detailed description of the invention when considered in conjunction with the accompanying drawings.

DETAILED DESCRIPTION OF THE PREFERRED EMBODIMENTS

An embodiment of a driving system for an electric vehicle in accordance with the present invention will be described below, referring to the accompanying drawings.

Figure 1:
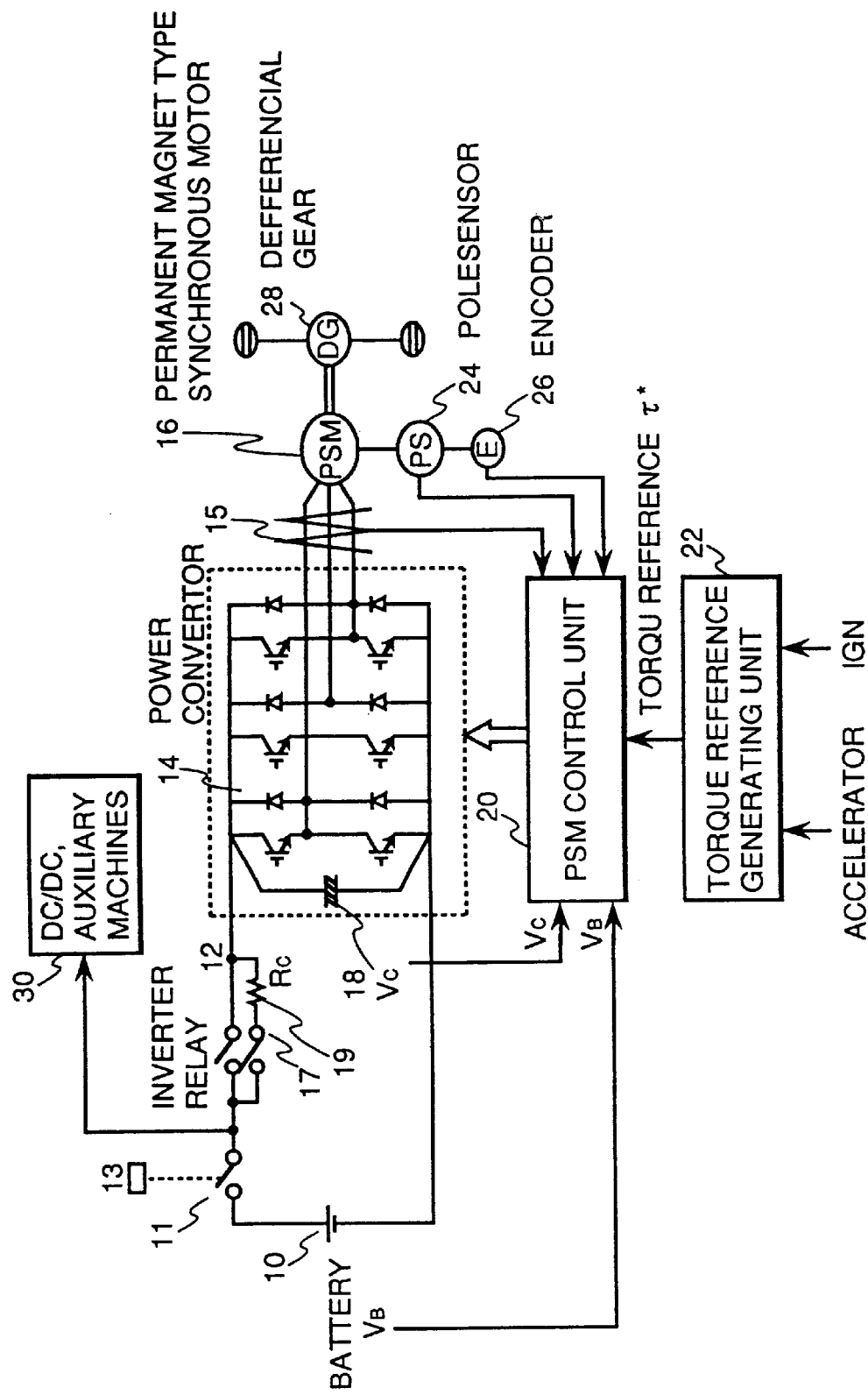
FIG. 1 is a circuit diagram showing the construction of an embodiment of a system in accordance with the present invention.

FIG. 1 is a circuit diagram showing the construction of an embodiment of a driving system for an electric vehicle in accordance with the present invention. Referring to the figure, a battery 10 is connected to an inverter 14 through a main relay 11 and an inverter relay 12. Opening and closing of the main relay 11 is controlled through a key switch 13 IGN. A pre-charge relay 17 and a pre-charge resistor 19 are connected to the inverter relay 12 in parallel.

The inverter 14 converts DC electric power from the battery 10 into AC electric power to supply a synchronous motor 16 for driving the electric vehicle. In this embodiment, the synchronous motor 16 is a permanent-magnet type synchronous motor. The inverter 14 has a plurality of power switching elements to which ON-OFF control is performed by a PSM control unit 20.

The torque reference generating unit 22 generates a torque reference value $\tau M^*$ corresponding to an accelerator opening based on the accelerator reference converting unit 23 during both power driving and regenerative running, and the torque reference value $\tau M^*$ is transmitted to the PSM. control unit 20.

A motor current of the synchronous motor 16 is detected with a current detector 15. A pole position of the permanent-magnet type motor 16 is detected with a pole position sensor 24, and a rotating angle is detected with an encoder 26. Then, these detected values are transmitted to the PSM control unit 20.

The PSM control unit 20 performs ON-OFF control for the switching elements of the inverter 14 based on the detected values of the current detector 15, the pole position sensor and the encoder 26 and the torque reference $\tau M^*$ transmitted from the torque reference generating unit 22. The reference character 28 indicates a gear-box TM of the electric vehicle and the reference character 30 indicates the other auxiliary components such as a DC/DC converter.

In the figures, the reference character $V_B$ indicates a battery voltage, the reference character $V_1$ indicates an inverter output voltage, the reference character $V_O$ indicates an induced electromotive force of the synchronous motor and the reference character $V_C$ indicates an allowable voltage of the smoothing capacitor.

In the present invention, a peak value $V_{Omax}$ of the maximum induced electromotive force at the maximum allowable rotating speed $N_2$ of the synchronous motor satisfies a relation of $V_{Omax} \leq V_{Cmax}$ where $V_{Cmax}$ is an allowable voltage of the smoothing capacitor which is a main part of the inverter.

Figure 2:
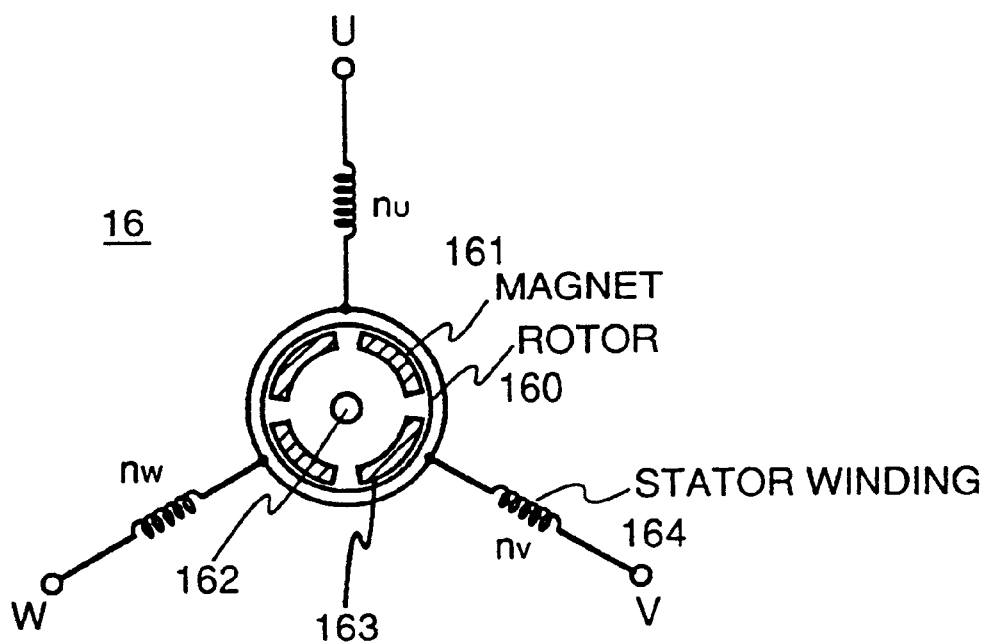
FIG. 2 is a diagram explaining the construction of the permanent-magnet type synchronous motor of FIG. 1.

FIG. 2 shows the construction of the synchronous motor 16. The reference character 160 indicates a rotor having a plurality of embedded magnets 161 and a rotating shaft 162, and the reference character 163 indicates a stator having stator windings 164 ($N=n_u, n_v, n_w$) for respective phases of U, V, W.

Figure 3:
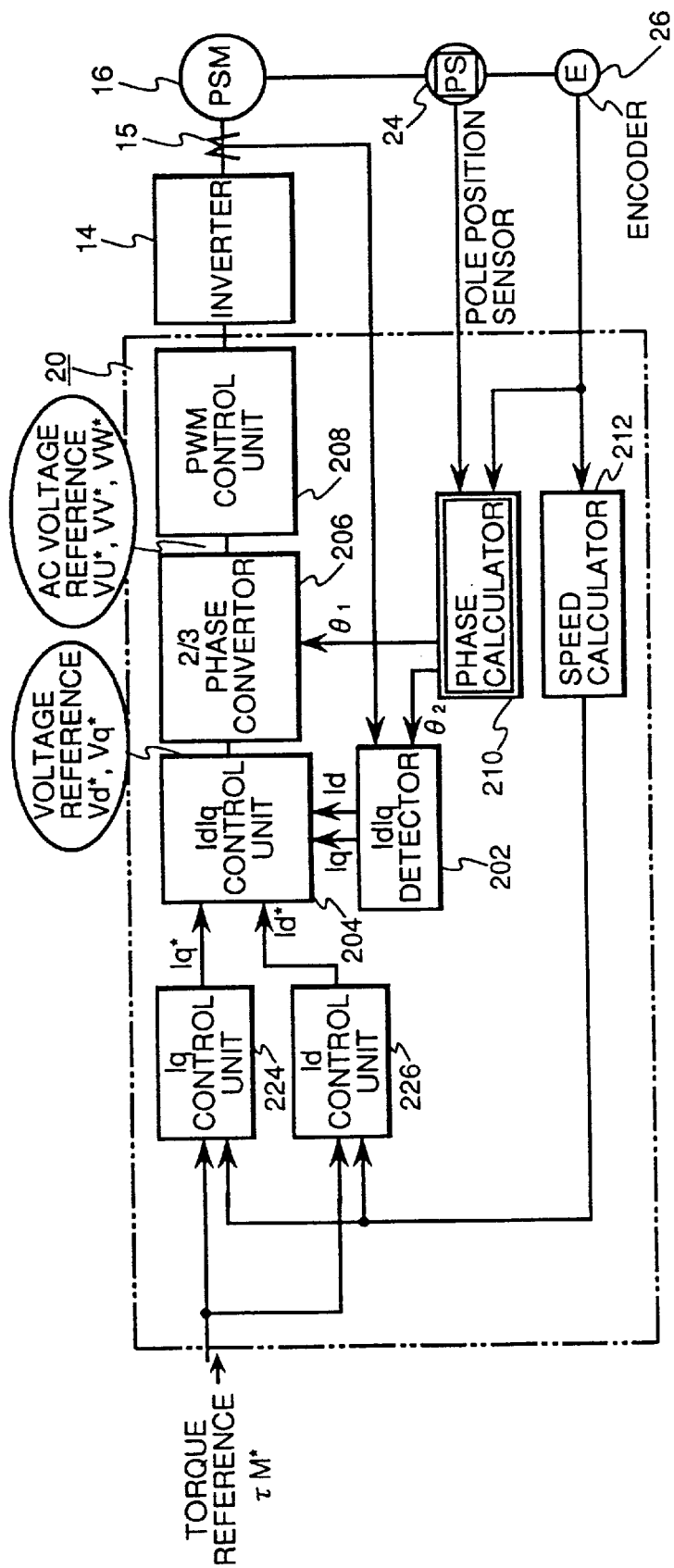
FIG. 3 is a circuit diagram showing the detailed construction of the PSM control unit of FIG. 1.

FIG. 3 is a block diagram showing internal elements of the PSM control unit 20. The PSM control unit 20 comprises an $I_d I_q$ detector 202, an $I_d I_q$ current control unit 204, a 2/3 phase converter 206, a PWM control unit 208, a phase calculator 210 and a speed calculator 212. The speed calculator 212 is connected to the encoder 26, and the phase calculator 210 is connected to the pole position sensor 24. The PSM control unit 20 further comprises an $I_q$ control unit 224 and an $I_d$ control unit 226.

The torque reference generating unit 22 (FIG. 1) generates a target torque reference value $\tau M^*$ of the PSM control unit using an accelerator opening operated by a driver and a motor rotating speed.

In the PSM control unit 20, a q-axis current reference value $I_q^*$ equivalent to a torque current component is calculated by the $I_q$ control unit 224, based on the torque reference value $\tau M^*$. At the same time, a d-axis current reference value $I_d^*$ is calculated by the $I_d$ control unit 226, based on the torque reference value $\tau M^*$ and the rotating speed. Based on the rotating speed as described above, the $I_d$ control unit 224 and the $I_q$ control unit 226 calculate the current reference values $I_q^*$, $I_d^*$ necessary for high efficiency control by which losses of the inverter and the synchronous motor are minimized.

The $I_d I_q$ detector 202 calculates d- and q-axis currents $I_d$, $I_q$ by performing 3-phase/2-phase coordinate transformation of three-phase alternating current of the motor current detected by the current detector 15. The $I_d I_q$ current control unit 204 calculates voltage reference values $V_q^*$, $V_d^*$ by proportional or proportional-integral control processing based on these detected values and the current reference values $I_q^*$, $I_d^*$.

Further, in the 2/3-phase converter 206, three-phase alternating current reference values $V_U^*$, $V_V^*$, $V_W^*$ are calculated through 2-phase/3-phase coordinate transformation. The PWM control unit 20 generates a PWM signal for the inverter 14 by comparison with a triangular carrier wave signal using the three-phase alternating current reference values $V_U^*$, $V_V^*$, $V_W^*$ to drive the inverter 14. In the manner described above, the motor currents are controlled to the current reference values $I_q^*$, $I_d^*$ by applying the PWM controlled voltage to the motor 16.

Phase angles $\theta_1$, $\theta_2$ used in the coordinate transformation processes in the 2/3-phase converter 206 and the $I_d I_q$ detector 202 are calculated in the phase calculator 24 using outputs of the pole position sensor 24 (a signal having the same phase as an induced electromotive force of the motor 16) and the encoder 26 (a rotating angle signal in the form of a pulse signal).

Figure 4:
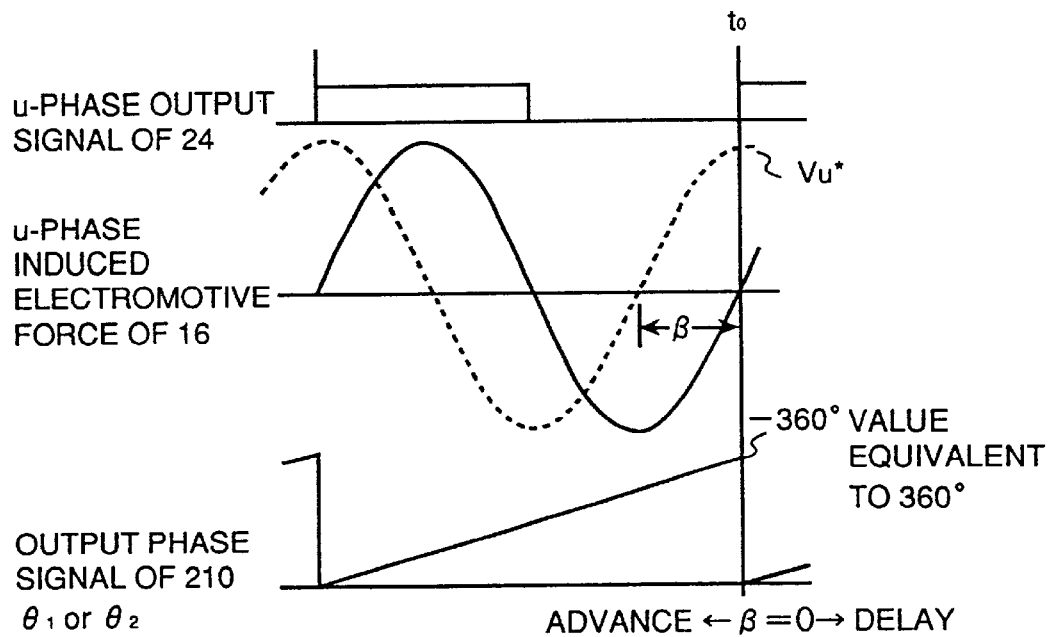
FIG. 4 is a graph showing the phase relationship between an output signal of the pole position sensor and an output signal of the encoder of FIG. 3.

FIG. 4 shows the phase relationship between the output signal of the pole position sensor 24 and the output signal of the encoder 26. A phase signal of the phase calculator 210 obtained by accumulating the pulse signals of the encoder 26 is brought into synchronism with the induced electromotive force of the motor 16 using the pole position signal as shown by the saw-tooth shaped wave in FIG. 4.

By means of such processing, the motor 16 is controlled to provide a torque indicated by the torque command value $\tau M^*$, with high efficiency and minimum loss.

Figure 5:
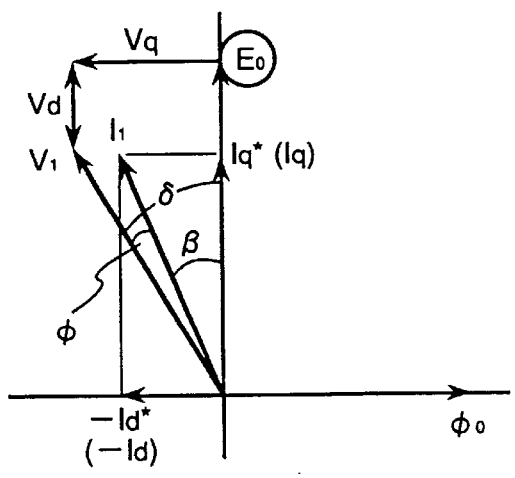
FIG. 5 is a vector diagram which illustrates normal running.

FIG. 5 shows a vector diagram of voltages in the motor 16 in the state at that time. The motor is controlled with an optimum advance angle $\beta$ ($\beta=\tan^{-1}(I_d^*/I_q^*)$) using $I_d^*$, $I_q^*$ for obtaining a high efficiency point. The reference point of the advance angle $\beta$ is a time point to shown in FIG. 4, and the dashed line indicates an alternating current voltage $V_u^*$ which is controlled at the time point $t_0$.

The output torque of the motor 16 can be expressed by Equation (1).

$$\tau M = P_n[\{V_O + (1-\rho)L_d I_d\} I_q] \quad (1)$$

where $P_n$ is a constant, $\rho$ is a ratio of $L_q$ to $L_d$, and $V_O$ is an induced electromotive force.

In Equation (1), the first term in the right side of the equation is called as a synchronous torque and the second term is called as a reactance torque.

Figure 6:
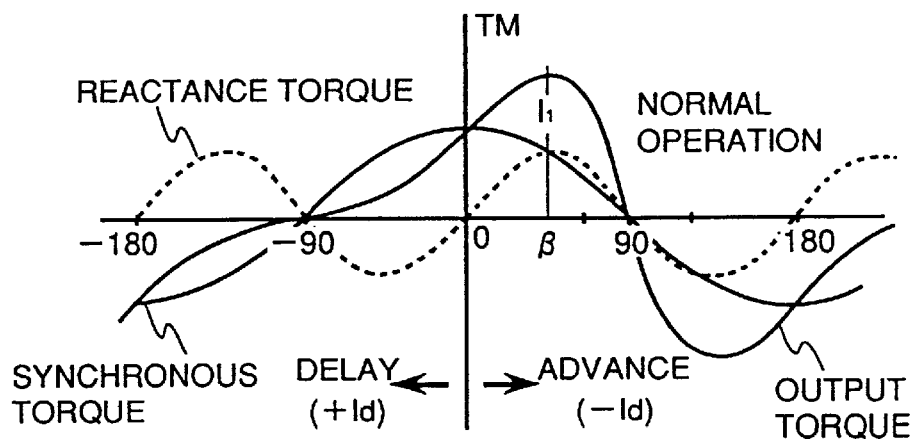
FIG. 6 is a graph showing output torque during normal running.

FIG. 6 shows the torque characteristics for these torques as a function of the advance angle $\beta$, when the voltage applied to the motor is held constant. The output torque $\tau M$ is the sum of the synchronous torque and the reactance torque. As shown in the figure, in the synchronous motor having a reverse protruding polar characteristic in which $\rho$ in Equation (1) is larger than 1 (one), since the maximum torque is generated at a value of angle $\beta$ which is approximately 45 degrees, the motor is controlled at an advance angle above the angle $\beta$. The electric vehicle is driven in such an operation.

Figure 7:
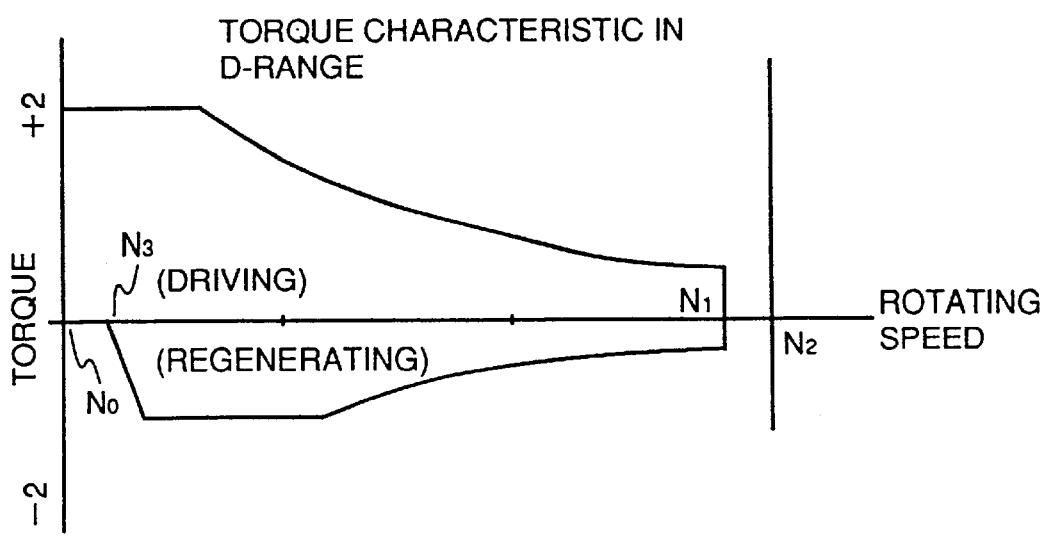
FIG. 7 is a graph showing the torque characteristic of a motor in D-range.

FIG. 7 shows the torque characteristic of the synchronous motor in the control system in accordance with the present invention during power driving, and torque during regenerating braking when the gearbox 28 is in D (drive) range. The line $N_0$-$N_1$ represents the power driving controllable range, and regenerative control is performed on the line $N_3$-$N_1$. Therefore, the maximum limit of controllable range is a motor rotating speed of $N_1$.

The maximum allowable motor rotating speed of the PSM in accordance with the present invention is to be expressed by $N_2$. The maximum allowable motor rotating speed $N_2$ is determined by taking the maximum inclination of public roads and an aerodynamic resistance of the vehicle body into consideration.

In the driving system in accordance with the present invention, the inverter relay 17 is opened within the range from $N_1$ to $N_2$ of rotating speed of the synchronous motor 16, based on the premise that the output frequency of the inverter reaches the limit.

Figure 8:
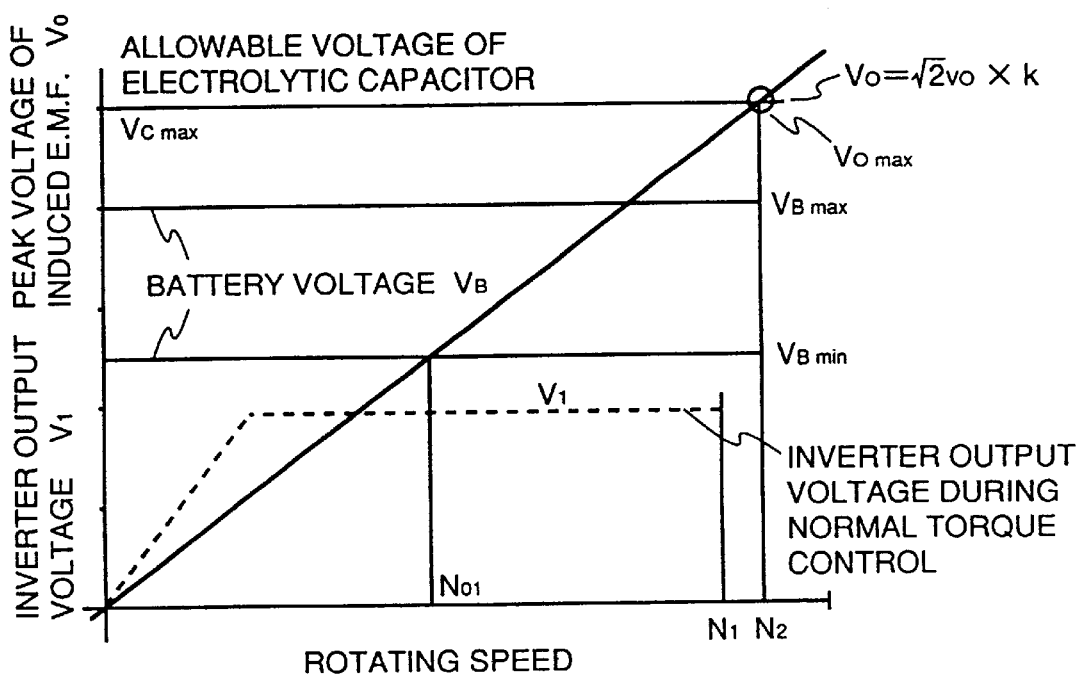
FIG. 8 is a graph showing a motor control method in accordance with the present invention.

FIG. 8 is a graph showing the relationship between inverter output voltage $V_1$ and peak value $V_0$ of induced electromotive force of the motor in the present invention, and the motor control method in accordance with the present invention. During the normal torque control condition, in both power driving and regenerative driving, the driving system is controlled along the voltage $V_1$ shown by the dashed line within the range of $N_0$-$N_1$. The relationship between the peak value $V_0$ of induced electromotive force of the synchronous motor and the rotational speed follows the characteristic shown by the solid line. The characteristic of the peak value $V_0$ of induced electromotive force of the synchronous motor 16 is $V_O = \sqrt{2} v_O \cdot \alpha$.

There, $v_0$ is an effective value of the induced electromotive force, and $\alpha$ is a peaking ratio when slot-ripples are taken into consideration. The peaking ratio is in the range of $1.0 \leq \alpha \leq 1.5$, and generally $\alpha \approx 1.1 \sim 1.2$.

Therefore, the peak value $V_0$ of induced electromotive force $V_0$ is larger than the maximum value ($\sqrt{2} v_0$) of induced electromotive force.

Further, the peak value $V_{Omax}$ of the maximum induced electromotive force 16 at the maximum allowable rotating speed N2 of the synchronous motor is set so as to satisfy the following relation:

$$V_{Cmax} \leq V_{Cmax}, \quad (2)$$

where $V_{Cmax}$ is an allowable voltage of the smoothing capacitor 18 of a main component of the inverter 14.

For example, when the synchronous motor shown in FIG. 2 comprises stator windings ($N_u$, $N_v$, $N_w$) for U-, V-, W-phases, the synchronous motor is designed so that $V_O$ obtained by the following equation satisfies the above condition of $V_{Cmax}$:

$$V_0 = \sqrt{2} v_O \cdot \alpha \quad (3)$$

$$V_O = k \cdot \phi_O \cdot N(u, v, w) \cdot \omega_r \quad (4)$$

where $v_O$ is an effective value of the induced electromotive force, $\phi_O$ is a magnetic flux of the magnet, $N(u, v, w)$ is the number of turns of the windings in each of U-, V-, W- phases, k is a constant which is determined by number of poles, winding coefficient and so on, $\omega_r$ is an angular velocity value, and $\alpha$ is a peaking ratio.

In the driving system in accordance with the present invention, even when the inverter 14 is stopped (that is, the driving signal for the power switching elements is stopped due to occurrence of any abnormality during the normal torque controlling in the whole driving range up to speed $N_2$ of the synchronous motor 16) and the peak value $V_{Omax}$ of the maximum induced electromotive force at that time is applied to the inverter while the inverter relay is kept open, the peak value $V_{Omax}$ of the maximum induced electromotive force is lower than the allowable voltage $V_{Cmax}$ of the smoothing capacitor 18. Therefore, the inverter 14 cannot be damaged.

As described above, according to the present invention, it is possible to provide a low cost driving system for an electric vehicle which has a high reliability and is well protected against failure of the inverter at occurrence of induced electromotive force, even when the motor is driven at the maximum allowable rotating speed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for driving an electric vehicle, comprising:

a permanent-magnet type synchronous traction motors a battery;

an inverter for converting DC electric power from the battery into AC electric power which is supplied to the synchronous motor;

a smoothing capacitor connected in parallel to the inverter for smoothing the AC electric power; and a PSM control unit for performing ON-OFF control of a plurality of power switching elements composing said inverter based on a torque reference and a motor current;

wherein an induced electromotive force of said synchronous motor is set so that a peak value $V_{Omax}$ of the maximum induced electromotive force at a maximum allowable rotating speed $N_2$ of said synchronous motor satisfies the condition $V_{Omax} \leq V_{Cmax}$, $V_{Cmax}$ being an allowable voltage of said smoothing capacitor; and wherein $V_0$ obtained by the following equation satisfies said condition of $V_{Omax}$:

$$V_0 = \sqrt{2} v_0 \cdot \alpha$$

$V_0$ being an effective value of the induced electromotive force, and $\alpha$ being a peaking ratio, taking slot ripples into consideration.

2. A driving system for an electric vehicle according to claim 1, wherein said permanent-magnet type synchronous motor comprises a rotor having permanent magnets and a stator having windings ($N_u$, $N_v$, $N_w$) for U-, V-, W-phases, and the rotor and the stator of said synchronous motor are constructed so that:

$$v_0 = k \cdot \phi_0 \cdot N(u, v, w) \cdot \omega r$$

where, $\phi_0$ is a magnetic flux of the magnet, $N(u, v, w)$ is number of turns of winding in each of U-, V-, W-phases, k is a constant which is determined by a number of poles, and a winding coefficient, and $\omega r$ is an angular velocity value.

3. A method for an electric vehicle propelled by a permanent-magnet type synchronous motor and having a battery, an inverter for converting DC electric power from the battery into AC electric power which is supplied to the synchronous motor, a smoothing capacitor connected in parallel to the inverter for smoothing the AC electric power, a PSM control unit for performing ON-OFF control of a plurality of power switching elements composing said inverter based on a torque reference and a motor current, said method comprising:

setting an induced electromotive force of said synchronous motor so that a peak value $V_{0max}$ of the maximum induced electromotive force at a maximum allowable rotating speed $N_2$ of said synchronous motor satisfies the condition $V_{0max} \leq V_{Cmax}$, $V_{Cmax}$ being an allowable voltage of said smoothing capacitor; and wherein $V_0$ obtained by the following equation satisfies said condition of $V_{0max}$:

$$V_0 = \sqrt{2} v_0 \cdot \alpha$$

$V_0$ being an effective value of the induced electromotive force, and $\alpha$ being a peaking ratio, taking slot ripples into consideration.

4. Method according to claim 3, wherein said permanent-magnet type synchronous motor comprises a rotor having permanent magnets and stator having windings ($N_u$, $N_v$, $N_w$) for U-, V-, W-phases, and the rotor and the stator of said synchronous motor are constructed so that:

$$v_0 = k \cdot \phi_0 \cdot N(u, v, w) \cdot \omega r$$

where $\phi_0$ is a magnetic flux of the magnet, $N(u, v, w)$ is number of turns of windings in each of U-, V-, W-phases, k is a constant which is determined by a number of poles and a winding coefficient, and $\omega_r$ is an angular velocity value.

* * * * *